(12) United States Patent
Shibamoto et al.

(10) Patent No.: US 7,517,438 B2
(45) Date of Patent: Apr. 14, 2009

(54) MAGNETIC RECORDING DISK, MAGNETIC RECORDING DISK MANUFACTURING METHOD AND MAGNETIC RECORDING DISK MANUFACTURING SYSTEM

(75) Inventors: Masahiro Shibamoto, Kanagawa (JP); Sinji Furukawa, Tokyo (JP); Tetsuya Endoh, Tokyo (JP); Miho Sakai, Tokyo (JP); Naoki Watanabe, Tokyo (JP)

(73) Assignee: Canon Anelva Corporation, Tokyo (JP)

( * ) Notice: Subject to any disclaimer, the term of this patent is extended or adjusted under 35 U.S.C. 154(b) by 600 days.

(21) Appl. No.: 11/113,630

(22) Filed: Apr. 25, 2005

(65) Prior Publication Data

US 2005/0214589 A1    Sep. 29, 2005

Related U.S. Application Data

(62) Division of application No. 10/090,350, filed on Mar. 4, 2002, now Pat. No. 7,115,191.

(30) Foreign Application Priority Data

Mar. 5, 2001   (JP) ............................... 2001-60979

(51) Int. Cl.
*C23C 14/34* (2006.01)
(52) U.S. Cl. ............................. 204/298.25; 204/298.11; 204/298.23
(58) Field of Classification Search ............ 204/298.11, 204/298.25, 298.23
See application file for complete search history.

(56) References Cited

U.S. PATENT DOCUMENTS

| | | | | |
|---|---|---|---|---|
| 4,776,938 A * | 10/1988 | Abe et al. | ............... | 204/192.15 |
| 5,087,482 A | 2/1992 | Kawai et al. | | |
| 5,700,593 A | 12/1997 | Okumura et al. | ........ | 428/694 TS |
| 5,705,287 A * | 1/1998 | Doerner et al. | ............... | 428/827 |
| 5,846,328 A * | 12/1998 | Aruga et al. | ................. | 118/718 |
| 6,068,742 A | 5/2000 | Daxinger et al. | | |
| 6,328,856 B1 | 12/2001 | Brucker | | |
| 6,461,484 B2 * | 10/2002 | Yo et al. | ................. | 204/192.12 |
| 6,730,197 B2 | 5/2004 | Wang et al. | | |
| 2002/0018920 A1 * | 2/2002 | Yamamoto et al. | ..... | 428/694 TS |
| 2002/0132139 A1 | 9/2002 | Chang et al. | .......... | 428/694 TM |
| 2003/0199680 A1 * | 10/2003 | Sakawaki et al. | .......... | 536/23.2 |

FOREIGN PATENT DOCUMENTS

JP    59-215045    12/1984

(Continued)

*Primary Examiner*—Rodney G McDonald
(74) *Attorney, Agent, or Firm*—Hogan & Hartson LLP

(57) ABSTRACT

This invention presents a magnetic recording disk where an anisotropy-allowing layer to allow magnetic anisotropy to a magnetic recording layer is provided between a substrate and the magnetic recording layer. This invention also presents a magnetic-recording-disk manufacturing method comprising a step to prepare an anisotropy-allowing layer to allow magnetic anisotropy to a magnetic recording layer, prior to a step to prepare the magnetic recording layer. This invention also presents a magnetic-recording-disk manufacturing system comprising an anisotropy-allowing-layer preparation chamber, in which an anisotropy-allowing layer to allow magnetic anisotropy to a magnetic recording layer is prepared on a substrate, prior to preparation of the magnetic recording layer. In this invention, the anisotropy-allowing layer is made of; nitride of niobium, tantalum, niobium alloy or tantalum alloy, or nitride-including niobium, tantalum, niobium alloy or tantalum alloy.

19 Claims, 9 Drawing Sheets

| FOREIGN PATENT DOCUMENTS | | |
|---|---|---|
| JP | 05-320893 | 12/1993 |
| JP | 10-036963 | 2/1998 |
| JP | 10-092638 | 4/1998 |
| JP | 10-121234 | 5/1998 |
| JP | 10-162338 | 6/1998 |
| JP | 10-168567 | 6/1998 |
| JP | 10-340441 | 12/1998 |
| JP | 11-039634 | 2/1999 |

* cited by examiner

MAGNETIC RECORDING DISK, MAGNETIC RECORDING DISK MANUFACTURING METHOD AND MAGNETIC RECORDING DISK MANUFACTURING SYSTEM

This is a divisional of application Ser. No. 10/090,350, filed Mar. 4, 2002, now U.S. Pat. No. 7,115,191 which application is hereby incorporated by reference in its entirety.

BACKGROUND OF THE INVENTION

1. Field of the Invention

This invention relates to magnetic recording disks widely used as storage media in computers, such as hard disks. This invention also relates to manufacture of such magnetic recording disks.

2. Description of the Related Art

Magnetic recording disks such as hard disks and flexible disks are widely used as storage media in computers. Magnetic recording disks have a basic structure where a magnetic recording layer is provided on a disk-shaped substrate.

Manufacture of a magnetic recording disk is described as follows, taking a hard disk as an example. Conventionally, a substrate made of aluminum is employed in manufacturing a hard disk. A NiP (nickel phosphide) film is deposited on the aluminum-made substrate. On the NiP film, such a film as CoCr film is deposited as an underling layer. On the underlying layer, such a film as CoCrTa film is deposited as a magnetic film for the magnetic recording layer. On the magnetic recording layer, a carbon film having a structure similar to diamond, which is called "diamond-like-carbon (DLC) film", is deposited as a protection layer called "overcoat".

In manufacture of magnetic recording disks, several limitations are foreseen from the point of view increasing recording density. This point is described as follows. Recent recording density in magnetic recording disks has been soaring remarkably. Currently it is reaching 35 gigabit/inch$^2$, supposedly 100 gigabit/inch$^2$ in the future. For higher recording density, it is necessary to make magnetic domains shorter and track width narrower in the longitudinal recording that is generally adopted. For making magnetic domains shorter and track width narrower, it is required to reduce distance between a magnetic head, which is for write-and-readout of information, and a magnetic recording layer. This distance is often called "spacing" in this field. The length of each magnetic domain is often called "bit length". If spacing is wider at shorter bit length and narrower track width, write-and-readout errors would take place because magnetic flux cannot be captured sufficiently by the magnetic head.

Factor of magnetization-transition region is also important in increasing recording density. In the longitudinal recording, magnetic domains are magnetized alternatively to opposite directions along a track. Each boundary of the magnetic domains does not demonstrate clear linearity in width of the track. This is because the magnetic film is collectively made of fine crystal grains. Each boundary is formed of outlines of crystal grains. Therefore, each boundary is zigzag-shaped. Boundary of magnetic domains is called "magnetization-transition region" because it is the place where magnetization is inverted. Because each boundary is zigzag-shaped, magnetization transition averaged in track width is not sharp but gently. This means magnetization-transition region is wider. When magnetization-transition region is wider, the number of magnetic domains capable of being provided in limited length of a track is smaller. Therefore, factor of magnetization-transition region lies as a bottleneck in enhancing recording density.

To narrow magnetization transition region, it is required to deposit a magnetic film of smaller crystal grains. For making grains smaller, making a magnetic film thinner is one solution. However, when grains are made smaller, the problem of thermal decay of magnetization becomes more serious. This point is described as follows.

When a magnetic domain is magnetized, theoretically the magnetization is sustained unless the inverse magnetic field is applied to it. Practically, however, the magnetization is dissolved slightly and slightly from the thermal decay as time passes. Therefore, permanent sustenance of the magnetization is impossible unless the magnetic domain is cooled at the absolute zero temperature. If the problem of the thermal decay appears extremely, recorded information may vanish partially after several years pass. Such the result is greatly serious in case that the magnetic recording disk is used for semi-permanent information storage.

The thermal decay is a phenomenon of thermal magnetic relaxation that a magnetized particle is magnetized inversely by its thermal oscillation. Particularly, magnetized particles adjacent to a magnetization-transition region have high possibility of the thermal relaxation, i.e. inverse magnetization, from influence of the inverse field by a neighboring magnetic domain. In magnetic films for magnetic recording, such the thermal decay may take place easily when the grains are made smaller, because each grain becomes thermally unstable. Therefore, unless the problem of the thermal decay is solved, to make magnetization-transition shaper by making grains smaller may suffer difficulty.

SUMMARY OF THE INVENTION

The invention of this application presents a unique method to provide magnetic anisotropy with a magnetic film, as a method to solve the problem of thermal decay. The magnetic anisotropy means that intensity of magnetization differs depending on direction of magnetic field for magnetization. Otherwise, it can be expressed that coercive force differs depending on direction of magnetization.

Concretely, the invention of this application presents a magnetic recording disk; where an anisotropy-allowing layer that allows the magnetic anisotropy to a magnetic recording layer is provided between a substrate and the magnetic recording layer.

The invention of this application also presents a method for manufacturing a magnetic recording disk; comprising a step to prepare an anisotropy-allowing layer to allow the magnetic anisotropy to a magnetic recording layer, prior to a step to prepare a magnetic recording layer.

The invention of this application also presents a system for manufacturing a magnetic recording disk; comprising a magnetic-recording-layer preparation chamber in which a magnetic recording layer is prepared on a substrate, an anisotropy-allowing-layer preparation chamber in which an anisotropy-allowing layer to allow the magnetic anisotropy to the magnetic recording layer is prepared, and a transfer mechanism to transfer the substrate from the anisotropy-allowing-layer preparation chamber to the magnetic-recording-layer preparation chamber.

In this invention, the anisotropy-allowing layer is made of; nitride of niobium, tantalum, niobium alloy or tantalum alloy, or nitride-including niobium, tantalum, niobium alloy or tantalum alloy.

DETAILED DESCRIPTION OF PREFERRED EMBODIMENTS

Figure 1:
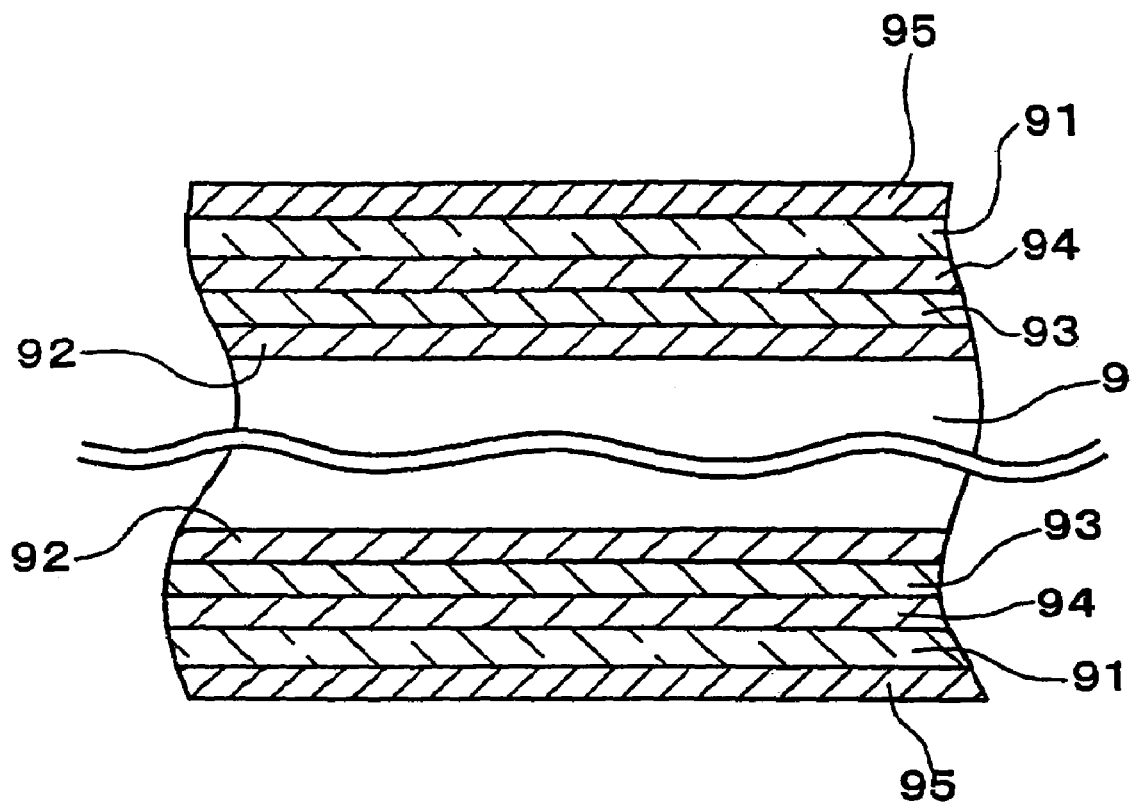
FIG. 1 is a schematic cross-sectional view of a magnetic recording disk as a preferred embodiment of the invention.

Preferred embodiments of this invention are described as follows. First of all, a magnetic recording disk as a preferred embodiment is described. It is shown in FIG. 1. The magnetic recording disk shown in FIG. 1 comprises a disk-shaped substrate 9, a magnetic recording layer 91 prepared on the substrate 9, and an anisotropy-allowing layer 92 prepared between the substrate 9 and the magnetic recording layer 91. The anisotropy-allowing layer 92 is to allow the magnetic anisotropy to the magnetic recording layer 91.

The substrate 9 is made of glass, which can be, for example, N5 of HOYA Corporation in Japan. The anisotropy-allowing layer 92, which is initially prepared on the substrate 9, characterizes this magnetic recording disk. An underlying layer 93 is prepared on the anisotropy-allowing layer 92. An intermediate layer 94 is prepared on the underlying layer 93. The magnetic recording layer 91 is prepared on the intermediate layer 94. An overcoat 95 is prepared on the magnetic recording layer 91.

The anisotropy-allowing layer 92 allows the anisotropy by coordinating crystal orientation of each grain in the magnetic recording layer 91. In manufacturing conventional magnetic recording disks, a nickel-phosphide film or nickel-aluminum film is initially prepared on a substrate. The anisotropy-allowing layer 92 may be a substitute for such the nickel-phosphide film or nickel-aluminum film.

The nickel-phosphide film and nickel-aluminum film in the conventional magnetic recording disks are to reinforce physical strength of the disks by increasing the hardness of the disks. In the study by the inventors, it has turned out that such a film initially deposited on the substrate 9 sometimes affects the magnetic anisotropy of the magnetic recording layer 91. Specifically, it has turned out that: when a film of nitride of niobium, tantalum, niobium alloy or tantalum alloy, or nitrogen-including niobium, tantalum, niobium alloy or tantalum alloy, is initially deposited on the substrate 9; the magnetic anisotropy can be effectively allowed to the magnetic recording layer 91. Therefore, the anisotropy-allowing layer 92 in the embodiment is the film of material selected from such the species. For example, a chromium-niobium (CrNb) alloy film is deposited as the anisotropy-allowing layer 92. Thickness of the film may be 1 to 200 nm.

As the underlying layer 93, a chromium film or chromium-tungsten (CrW) film is deposited. Otherwise, a double layer of a Cr film and a CrW film may be employed as the underlying layer 93. Thickness of the underlying layer 93 may be 1 to 50 nm. As the intermediate layer 94, for example, a Co-40 at % Cr film is deposited. Thickness of the film may be 0.5 to 10 nm. "At %" means mass ratio of alloy components converted at atomic weight, corresponding to ratio of the number of atoms. For example, "Co-40 at % Cr" means that chromium of forty atoms is included with cobalt of one hundred atoms.

As the magnetic recording layer 91, a cobalt-chromium-platinum-boron (CoCrPtB) alloy film or cobalt-chromium-platinum-tantalum (CoCrPtTa) alloy film is deposited. Thickness of the film may be 10 to 50 nm. In the case of CoCrPtTa, the composition is, for example, Co-20Cr-10Pt-2Ta(at %). In case of CoCrPtB, the composition is, for example, Co-20Cr-10Pt-6B(at %). As the overcoat 95, the DLC film is deposited. Thickness of the DLC film may be 1 to 10 nm.

Figure 2:
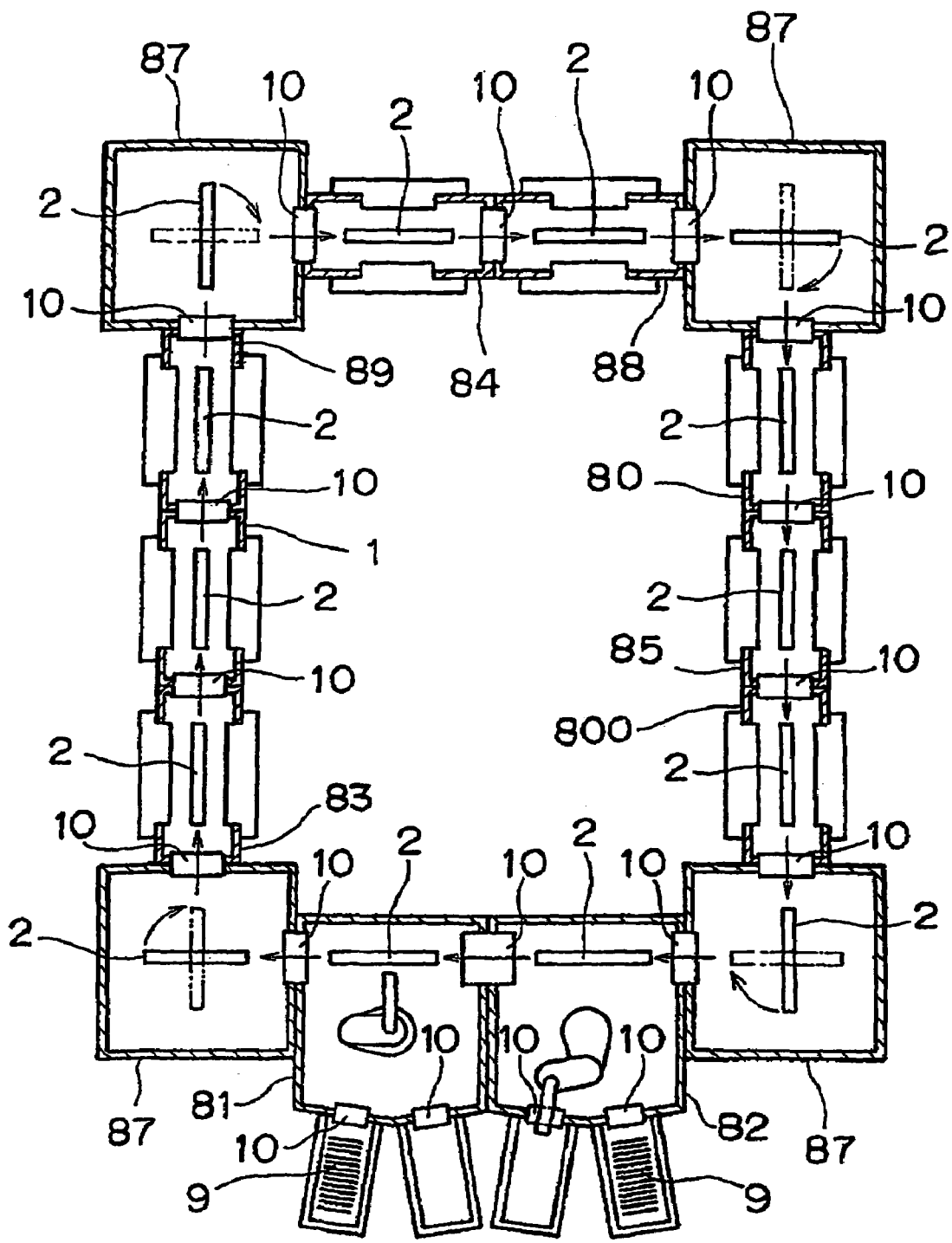
FIG. 2 is a schematic plane view of a magnetic recording disk manufacturing system as a preferred embodiment of the invention.

Next, the magnetic recording disk manufacturing system of the preferred embodiment is described as follows. It is shown in FIG. 2. The system shown in FIG. 2 is one of inline-type systems. The "inline type" is the general term for systems where a plurality of chambers is provided in a line, and a transfer path of substrates is provided through the chambers. In the system of this embodiment, a plurality of chambers 1, 80, 81, 82, 83, 84, 85, 87, 88, 89, 800 is aligned along a rectangular loop, through which a transfer path is provided.

Each chamber 1, 80, 81, 82, 83, 84, 85, 87, 88, 89, 800 is a vacuum chamber that is pumped through its own or a common pumping line. A gate valve 10 is provided at each boundary of the chambers 1, 80, 81, 82, 83, 84, 85, 87, 88, 89, 800. The substrates 9 are transferred along the transfer path by the transfer mechanism (not shown in FIG. 2), being loaded on a carrier 2.

A couple of chambers 81 and 82, which are aligned on one side of the rectangle, are the load-lock chamber 81 and the unload-lock chamber 82. In the load-lock chamber 81, the substrates 9 are loaded on the carrier 2. In the unload-lock chamber 82, the substrates 9 are unloaded from the carrier 2.

The chambers 1, 80, 83, 84, 85, 87, 88, 89, 800 aligned on the rest of sides of the rectangle are the process chambers in which a required process is carried out. Specifically, the chamber 83 is the pre-heat chamber in which the substrates 9 are heated prior to thin-film depositions. The chamber 84 is the underlying-layer preparation chamber in which the underlying layer is prepared on the anisotropy-allowing layer. The chamber 88 is the intermediate-layer preparation chamber in which the intermediate layer is prepared on the underlying layer. The chamber 80 is the magnetic-recording-layer preparation chamber in which the magnetic recording layer is prepared on the intermediate layer. The chamber 85 is the overcoat preparation chamber in which the overcoat is prepared on the magnetic recording layer. The chamber 800 is the extra chamber for a required use. The chambers 87 at the corners of the rectangle are the direction-conversion chambers in which a direction-conversion mechanism is provided.

The carrier 2 holds the substrates 9 at several points on the edges. In this embodiment, a couple of substrates 9 are held together on one carrier 2. The transfer mechanism moves the carrier 2 by driving force introduced from the outside atmosphere to the inside through a magnetic-coupling mechanism. Many driven rollers to support the carrier 2 are aligned on the transfer path. When the driven rollers are operated, the carrier 2 is moved transferring from one driven roller to another. As such the carrier 2 and the transfer mechanism, the disclosure in U.S. Pat. No. 6,027,618 can be employed.

For manufacturing the described magnetic recording disk, between the pre-heat chamber 83 and the underlying layer preparation chamber 84, the system of this embodiment comprises an anisotropy-allowing-layer preparation chamber 1 in which the anisotropy-allowing layer is prepared on the pre-heated substrate 9, and a gas-exposure chamber 89 in which the substrate 9 is exposed to a required gas. These chambers 1 and 89 are described in detail as follows.

Figure 3:
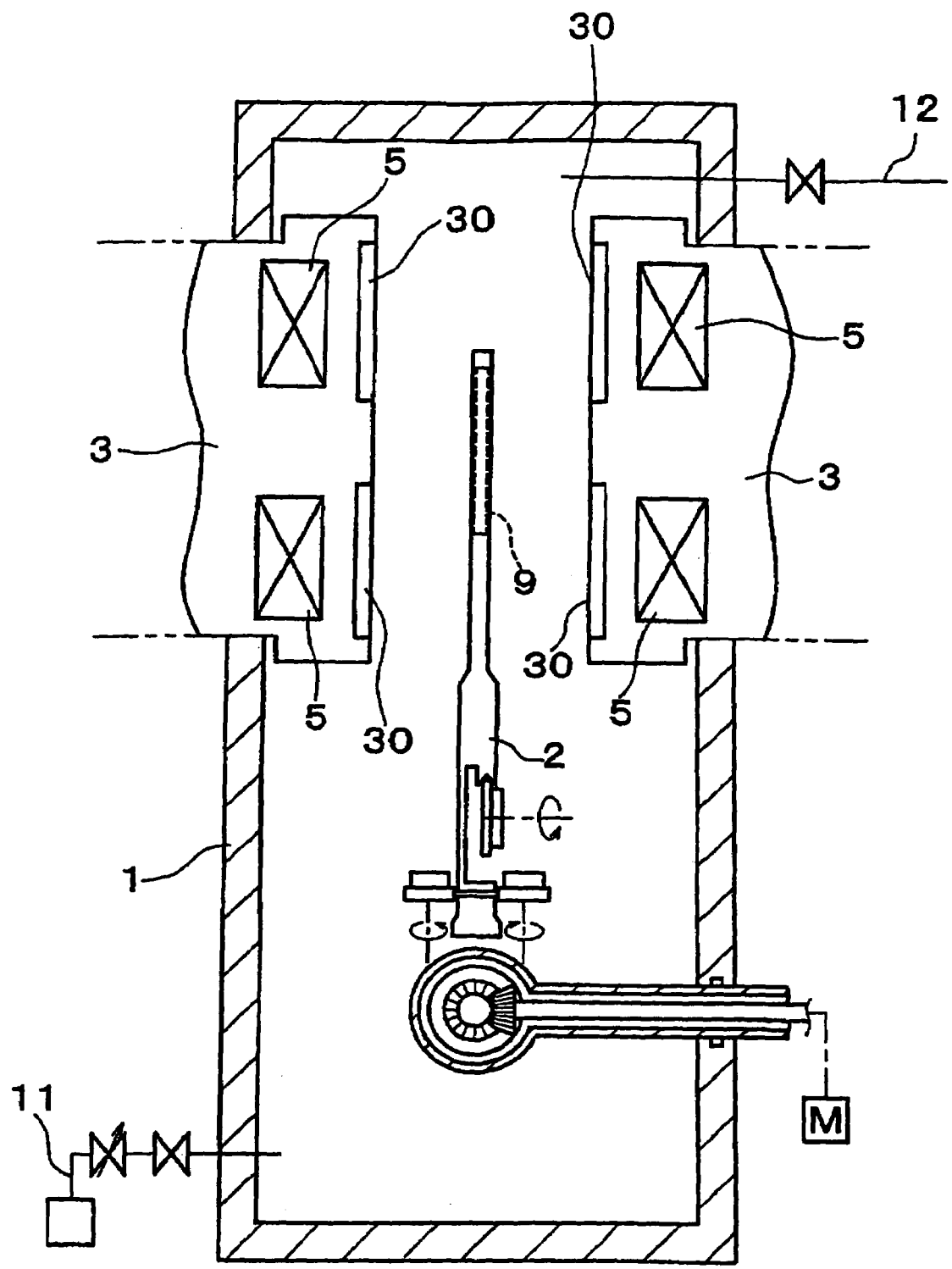
FIG. 3 is a schematic side cross-sectional view of the anisotropy-allowing-layer preparation chamber shown in FIG. 2.

The anisotropy-allowing-layer preparation chamber 1 is shown in FIG. 3. In the anisotropy-allowing-layer preparation chamber 1, a film for allowing the anisotropy, which is hereinafter called "anisotropy-allowing film", is deposited by sputtering. Concretely, the anisotropy-allowing-layer preparation chamber 1 comprises a pumping line 11 for pumping itself, a gas-introduction line 12 through which a required gas is introduced into the inside, a cathode unit 3 having a target 30 of which surface to be sputtered is exposed to the inside, a sputtering power supply (not shown) to apply voltage for the sputtering to the target 30, and a magnet assembly 5 provided behind the target 30 for the magnetron sputtering.

The anisotropy-allowing-layer preparation chamber 1 is characterized by two important points. One is that a nitride CrNb film is deposited as the anisotropy-allowing film. The other one is that relatively more number of the sputtered particles that travel having a direction component equal to the anisotropy to allow are incident on the substrates 9. Specifically, the target 30 is made of CrNb alloy. The gas-introduction line 12 introduces gas mixture of nitrogen and argon. In addition, as shown in FIG. 3, the target 30 is located eccentrically to the substrate 9 so that many of the sputtered particles from the target 30 can be incident obliquely on the substrate 9. "Sputtered particle" means particle released from a target during sputtering. Particles released from a target are usually in state of atom.

The pumping line 11 comprises a vacuum pump such as cryo-pump so that the anisotropy-allowing-layer preparation chamber 1 can be pumped down to about $10^{-6}$ Pa. In this embodiment, the cathode unit 3 is provided at both sides to the substrate 9 so that the thin film is deposited on both surfaces of the substrate 9 simultaneously.

The sputter power sources 4 are operated in state that the anisotropy-allowing-layer preparation chamber 1 is pumped at a required pressure as the gas mixture of argon and nitrogen is introduced through the gas-introduction line 12. As a result, the sputtering discharge is ignited, releasing sputtered particles from the targets 30, which deposit the anisotropy-allowing film of CrNb alloy on the substrate 9. After the film deposition is carried out on one substrate 9, the carrier 2 is moved to the position where the other substrate 9 faces to the target 30. Then, the film deposition is carried out on the other substrate 9. In this deposition, because of reaction with nitrogen, the anisotropy-allowing film is deposited as the nitride of CrNb alloy film or nitrogen-including CrNb alloy film. This "nitride of or nitrogen-including CrNb alloy film" is hereinafter simply called "CrNb nitride film".

Figure 4:
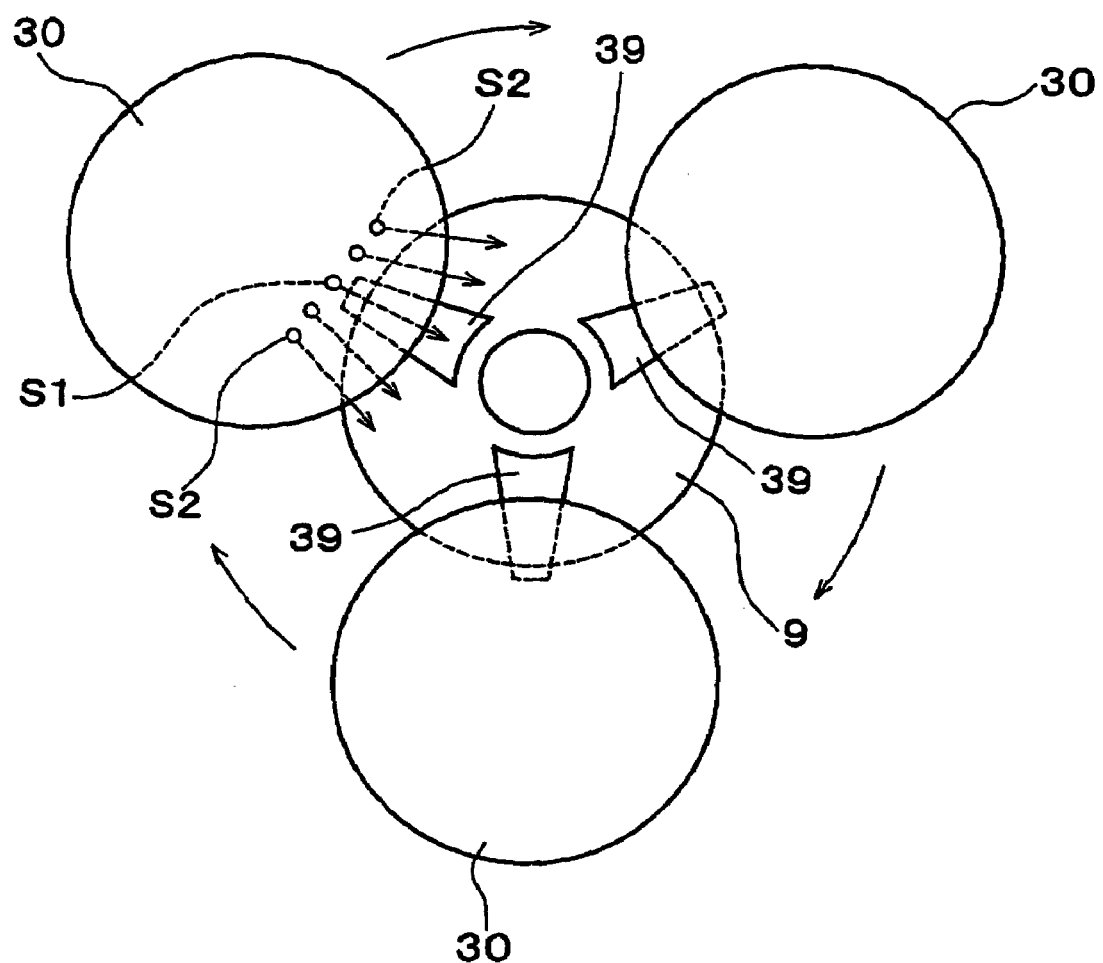
FIG. 4 is a schematic plane view explaining oblique incidence of sputtered particles for allowing the anisotropy.

Referring to FIG. 4, oblique incidence of sputtered particles for the anisotropy allowance is described as follows. As understood from FIG. 3 and FIG. 4, three targets 30 are provided in this embodiment. Each target 30 is equally distant from each other on a circle in coaxial to the substrates 9, i.e. at every 120 degree. The tree targets 30 are rotated by a main rotation mechanism coaxially with the substrate 9. A direction-control board 39 is provided between the targets 30 and the substrate 9. The direction-control board 39 is fixed to the targets 30 by a member so that it can be rotated together with the targets 30.

In the structure where the target 30 is placed eccentrically to the substrate 9, major sputtered particles from the target 30 are incident obliquely to the substrate 9. As shown in FIG. 4, though some sputtered particles S1 travel to the direction interconnecting the center of the target 30 and the center of the substrate 9 (hereinafter called "center-center direction"), many other sputtered particles S2 travel deviating from the center-center direction. These sputtered particles S2 that travel deviating from the center-center direction are hereinafter called "deviant oblique sputtered-particles". The deviant oblique sputtered-particles contribute to the anisotropy allowance to the magnetic recording layer.

The anisotropy-allowing-layer preparation chamber 1 in this embodiment comprises a main rotation mechanism. The main rotation mechanism is to rotate the targets 30 around axes eccentric to the targets 30 and corresponding to the substrate 9, so that a homogeneous and uniform film can be deposited. This mechanism is described in detail as follows.

Figure 5:
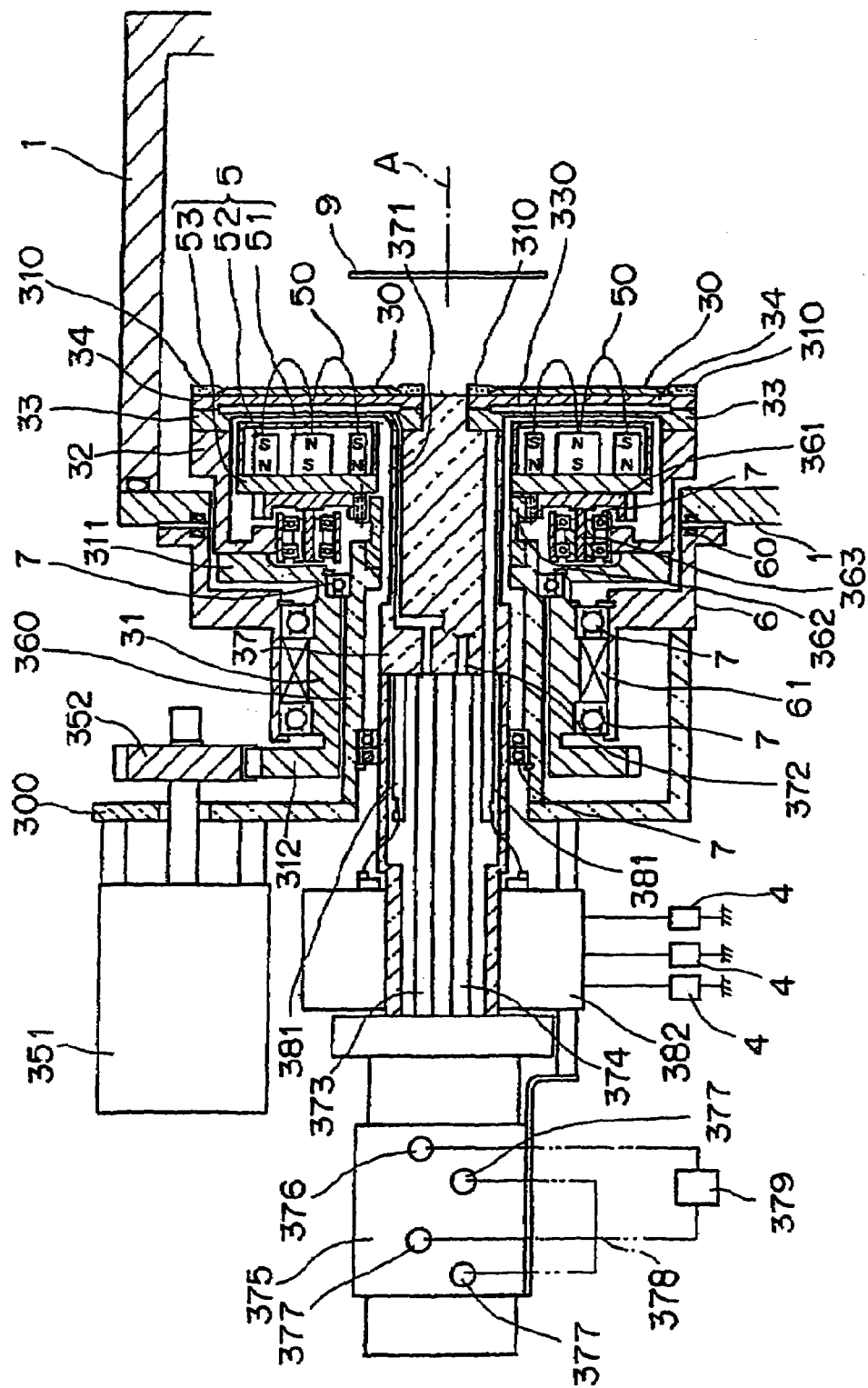
FIG. 5 is a detailed cross-sectional view of the cathode unit shown in FIG. 3.

The both cathode units 3 shown in FIG. 3 have the same structure, i.e. being symmetric interposing the substrate 9. In FIG. 5, the left side one of them is shown. As shown in FIG. 5, an opening a little wider than the cross section of the cathode unit 3 is provide on the side wall of the anisotropy-allowing-layer preparation chamber 1. The cathode unit 3 is inserted to this opening. A unit mount 6 is fixed on the outer surface of the side wall of the chamber 1. The unit mount 6 is cylindrical having a step in the cross-sectional configuration. The end of the unit mount 6 is fixed on the outer surface of the chamber 1, inserting a vacuum seal 60 such as O-ring.

A main holder 31 is provided inside the unit mount 6. The main holder 31 is also cylindrical and coaxial to the unit mount 6. The axis of the main holder 31 is hereinafter called "basis axis" and designated by "A" in FIG. 5. The carrier 2 is stopped at the position where the of the substrate 9 corresponds to the basis axis A.

A right holder-flange 311 is provided at the right end of the main holder 31. A cathode mount 32 is fixed on the right holder-flange 311. The cathode mount 32 is cylindrical and coaxial to the basis axis A, having the cross-sectional shape shown in FIG. 5. The right end of the cathode mount 32 is located inside the chamber 1, on which a cavity board 33 is fixed. A backing plate 34 is fixed on cavity board 33. The targets 30 are mounted on the backing plate 34 by a target clamp 310 for easy demount. In other words, the cavity board 33, the backing plate 34, the targets 3 are laid over in this order, being fixed on the right end of the cathode mount 32 as a whole. The cavity board 33 and the backing plate 34 are disk-shaped and a little larger than the target 30.

As shown in FIG. 4, three targets 3 are all disk-shaped and the same in size. Each target 30 is equally distant from each other on a circle coaxial to the basis axis A. The cavity board 33 is so configured as to form cavity 330 together with the backing plate 34. Coolant is introduced to this cavity 330.

The main rotation mechanism is one for rotating three targets 30 together around the rotation axis corresponding to the axis of the substrate 9, i.e. around the basis axis A. The main rotation mechanism is composed of the described main holder 31, a rotary actuator 351 such as motor to rotate the main holder 31, and other components.

Concretely, a left holder-flange 312 is provided at the left end of the main holder 31. The round edge of the left holder-flange 312 is a gear (hereinafter called "flange gear"). A driving gear 352 engaging the flange gear is connected with the output shaft of the rotary actuator 351. When the rotary actuator 351 is operated, the main holder 31 is rotated around the basis axis A through the driving gear 352. As a result, each target 30 is also rotated around the basis axis A that is eccentric from each target 30. The main holder 31 is supported by the unit mount 6. A bearing 7 is provided between the unit mount 6 and the main holder 31, allowing the rotation of the main holder 31. Thin-film deposition of uniform thickness is enabled by the described eccentric rotation, contributing to the magnetic anisotropy allowance.

Other components of the cathode unit 3 are described using FIG. 3 and FIG. 5 again as follows. As shown in FIG. 3 and FIG. 5, the magnetic assembly 5 is provided in the cathode mount 32. The magnetic assembly 5 is mainly composed of a center magnet 51, a peripheral magnet 52 surrounding the center magnet 51, and a yoke 53 interconnecting the center magnet 51 and the peripheral magnet 52. Magnetic flux 50, as shown in FIG. 5, penetrates the target 30, forming an arch at the fore discharge space. Electrons at the discharge space are confined in the closed region formed of the target 30 and the arch-shaped magnetic flux, resulting in that the highly-efficient magnetron sputtering is established.

The yoke 53, which is provided uprightly, is disk-shaped and a little smaller than the target 30. The center magnet 51 is, for example, short-column-shaped. The peripheral magnet 52 is, for example, circular-ring-shaped. Though the target 30 and the yoke 53 are coaxial to each other, shapes and arrangements of the center magnet 51 and the peripheral magnet 52 are asymmetrical to the axis of the target 30. In other words, the magnetic field applied by the magnet assembly 5 is asymmetrical to the axis of the target 30. This is to make the time-average magnetic field intensity more uniform on the target 30 when the magnet assembly 5 is rotated.

The magnetic assembly 5 is provided with each target 3. Therefore, the number of the magnetic assembly 5 in this embodiment is three. An extra rotation mechanism to rotate each magnet assembly 5 in coaxial with each target 30 is provided. The extra rotation mechanism rotates each magnet assembly 5 by the driving force for the main rotation mechanism. Concretely, the extra rotation mechanism is composed of a driven gear 361 provided on each magnetic assembly 5, and a standing gear 362 to transform the torque from the main rotation mechanism into the torque for rotating each magnet assembly 5.

Each driven gear 361 is fixed on the bottom of the yoke 53. Each driven gear 361 is coaxial to each target 30. A shaft 363 is fixed on the center of each driven gear 361, being lengthened horizontally. Each shaft 363 is mounted with the cathode mount 32, interposing a bearing 7.

The rotary actuator 351 of the main rotation mechanism is mounted on a base board 300. The base board 300 is provided uprightly. An opening though which a spindle 37 is inserted is provided with the base board 300. A gear holder 360 is provided at the edge of the opening, being lengthened horizontally. The gear holder 360 is roughly cylindrical of which the center axis corresponds to the basis axis A.

The standing gear 362 is fixed at the top of the gear holder 360. The standing gear 362, of which teeth are outward, is located at the position where its axis corresponds to the basis axis A. As shown in FIG. 5, the standing gear 362 engages each driven gear 361. Layout and engagement of the standing gear 362 and the driven gear 361 are shown in FIG. 5.

As understood from FIG. 5, because each magnet assembly 5 is connected with the cathode mount 32 by the shaft 363, when each target 30 is rotated around the basis axis A as the main holder 31 is rotated by the rotary actuator 351, each magnet assembly 5 and each driven gear 361 are rotated around the basis axis A as well. This rotation around the basis axis A is hereinafter called "revolution". Because each driven gear 361 engages each standing gear 362 at the side closer to the basis axis A, each driven gear 361 is rotated around the center axis corresponding to each target 30 during the revolution. This rotation around the center axis of the target 30 is hereinafter called "spin". As each driven gear 361 is spun, each magnet assembly 5 is spun together. After all, the magnet assembly 5 performs the revolution around the basis axis A and the spin around its center axis simultaneously. A bearing 7 is provided between the gear holder 360 and the unit mount 6.

The spindle 37 is provided penetrating the main holder 31 at the center. The spindle 37 holds the cavity board 33, the backing plate 34 and other members at the top. The spindle 37 is column-shaped at the right half and cylindrical, i.e. hollow, at the left half. A coolant introduction channel 371 is perforated through the right column-shaped portion (hereinafter "column portion"). The coolant is introduced through the coolant introduction channel 371 into the cavity 330. The coolant introduction channel 371 is ramified into three branches. Each branch reaches each cavity 330 behind each target 30 respectively. A coolant drainage channel 372 is perforated through the column portion. Not clearly shown in FIG. 5, the coolant drainage channel 372 is provided with each cavity 330.

In the left cylindrical half of the spindle 37 (hereinafter "cylindrical portion"), a coolant introduction pipe 373 and coolant drainage pipes 374 are provided. The coolant introduction pipe 373 is connected with the coolant introduction channel 371. The coolant drainage pipes 374 are connected the coolant drainage holes 372 respectively, though only one appears in FIG. 5.

Power-supply rods 381 are provided penetrating the column portion and the cylindrical portion of the spindle 37. The power-supply rods 381 are to supply power for the sputtering discharge to each target 30. Three power-supply rods 381 are provided, though only one appears in FIG. 5. As shown in FIG. 5, the top of the power-supply rod 381 is in contact with the cavity board 33. The cavity board 33 and the backing plate 34 are made of metal such as stainless-steel or cupper so that the power can be supplied through them to the target 30. An insulator (not shown) is provided between the power-supply rods 381 and the spindle 37, between the cavity board 33 and the targets 30, between the cavity board 33 and the spindle 37, and between the backing plate 34 and the spindle 37. Therefore, the power supplied through the power-supply rods 381 does not leak to the spindle 37.

In the described revolution, the spindle 37 is also revolved around the basis axis A. A slip ring 382 and a rotary joint 375 are provided so that the power supply and the coolant circulation are enabled in spite that the spindle 37 is revolved. As shown in FIG. 5, the slip ring 382 is provided surrounding the left end of the spindle 37. Power supply rods 381 are connected with the slip ring 382 by cables. The slip ring 382 is connected three sputter power sources 4, which are provided corresponding to three targets 30 respectively.

The slip ring 382 is to secure electrical continuity by contacting a spring band on a rotating cylinder. As the slip ring 382, for example "φ150-60 3ch SR" of Globe Tech Inc., Tachikawa, Tokyo, Japan can be employed. The rotary joint 375 is connected at the left end of the spindle 37. The rotary joint 375 comprises a coolant introduction hole 376 communicating to the coolant introduction pipe 373, and three coolant drainage holes 377 communicating to three coolant drainage pipes 374 respectively. In spite of the rotation of the spindle 37, the rotary joint 375 secures communication of the coolant introduction pipe 373 and the coolant introduction hole 376, and communication of each coolant drainage pipe 374 and each coolant drainage hole 377. As the rotary joint 375, for example "KT-4-02-1W" of KOYO YUATSU Co.,. Ltd., Setagaya, Tokyo, Japan can be employed.

The coolant introduction hole 376 communicates to each coolant drainage hole 377 through a pipe 378 and a circulator 379. The coolant cooled at a required low temperature by the circulator 379 is introduced to each cavity 330 through the coolant introduction hole 376, the coolant introduction pipe 373 and each coolant introduction channel 371. The coolant is drained from each cavity 330 back to the circulator 379 through each coolant drainage channel 372, each coolant drainage pipe 374 and each coolant drainage hole 377.

The three power-supply rods 381, the slip ring 382, the three sputter power sources 4 and other components compose a power-supply line to supply the power for the sputtering discharge to the targets 30. Each sputter power source 4 is capable of independent control of its output level so that the power supplied to each target 30 can be controlled independently.

In the described structure of the cathode unit 3, vacuum seals such as O-rings are provided at required places so that leakage of vacuum maintained in the anisotropy-allowing-layer preparation chamber 1 can be prevented. Especially, a magnetic-fluid seal 61 is adopted at the place between the unit mount 6 and the main holder 31. The magnetic-fluid seal 61, which utilizes magnetic fluid as sealant, prevents leakage of vacuum from clearance of the unit mount 6 and the main holder 31, allowing the rotation of the main holder 31.

Next, the gas-exposure chamber 89 is described as follows. The gas-exposure chamber 89 is a vacuum chamber comprising a pumping line to pump itself and a gas-introduction line to introduce a gas into itself. The gas-introduction line introduces oxygen in this embodiment so that the substrates 9 are exposed to oxygen. Pressure in the gas-exposure chamber 89 is maintained at 0.5-10 Pa. Therefore, the substrates 9 are exposed to oxygen of such pressure. Instead of oxygen, atmospheric gas or nitrogen gas may be used for the gas exposure. "Atmospheric gas" does not always mean "gas of atmospheric pressure", but just mean "gas of the same constitution as the atmosphere". Therefore, it is possibly employed that only pressure of the gas-exposure chamber 89 is made higher than the anisotropy-allowing-layer preparation chamber 1, for example a vacuum pressure adjacent to the atmospheric pressure, by introducing atmospheric gas into the inside.

Next, other components of the system are described as follows. The pre-heat chamber 83 is the chamber in which the substrates 9 are heated up to a required high temperature prior to the thin-film depositions. Temperatures of the substrate 9 to be kept during the thin-film depositions are often higher than the room temperature. The substrates 9 are heated in the pre-heat chamber 83 so that temperature of them can be a required value when they arrive at the underlying layer preparation chamber 84 or other chambers. Additionally, the pre-heating has another purpose of degassing, i.e. release of adsorbed gas.

The underlying layer preparation chamber 84 is the chamber in which the thin-film deposition is carried out by the sputtering as well as the described anisotropy-allowing-layer preparation chamber 1. A Cr film or Cr alloy film is adopted as the underlying layer. Therefore, the target in the underlying layer preparation chamber 84 is made of such material. Gas for the sputtering discharge in the underlying layer preparation camber 84 may be argon as well. As for relationship of the target and the substrates 9, any standing-facing-type or any target-rotation-type such as described may be employed. There may be the case that the sputtered-particles oblique-incidence method as described is employed in this chamber 84 as well for contributing to the anisotropy allowance to the magnetic recording layer.

The intermediate-layer preparation chamber 88 and the magnetic-recording-layer preparation chamber 80 are also the chambers in which a required thin film is deposited by sputtering. A CoCr alloy film is deposited as the intermediate layer, and a CoCrPtB alloy film or CoCrPtTa alloy film is deposited as the magnetic recording layer. Therefore, the target in the intermediate-layer preparation chamber 88 is made of CoCr alloy, and the target in the magnetic-recording-layer preparation chamber 80 is made of CoCrPtB alloy or CoCrPtTa alloy. Gas to be introduced may be argon for the both chambers 88,80. When the sputtered-particles oblique-incidence configuration is employed in the intermediate-layer preparation chamber 88 or the magnetic-recording-layer preparation chamber 80 as well, the anisotropy allowance is enhanced further.

The final goal is to allow the anisotropy to the magnetic recording layer. And, the described sputtered-particles oblique-incidence configuration is for this goal. Therefore, essentially the sputtered-particles oblique-incidence configuration should be employed in the magnetic recording layer preparation. However, in the research by the inventors, it has turned out that when the sputtered-particles oblique-incidence configuration is employed in a layer preparation prior to the magnetic recording layer preparation, the anisotropy can be allowed to the magnetic recording layer, even if it is not employed in the magnetic recording layer preparation. Considering this point, the magnetic-recording-layer preparation chamber 8 in this embodiment may comprise just a normal configuration, such as one that the target faces to the substrate 9 coaxially. If sputtered-particles direction control such as the sputtered-particles oblique-incidence configuration is employed in each layer preparation, each control should be one for orienting sputtered particles to the same direction corresponding to the anisotropy to be allowed to the magnetic recording layer.

The overcoat preparation chamber 85 is one in which the DLC film is deposited. The overcoat preparation chamber 85 is so configured that the DLC film can be deposited by plasma-enhanced chemical vapor deposition (PECVD) or sputtering. In case of PECVD, organic gas such as CH4 is introduced into the overcoat preparation chamber 85, which shifts in state of plasma through high-frequency (HF) discharge. Gas decomposition producing carbon takes place in the plasma, resulting in that a carbon film is deposited on the substrate 9. When the substrate 9 is heated at an adequate high temperature in this deposition, the film grows as the DLC film. In case the DLC film is deposited by sputtering, a target made of carbon is used.

Next, operation of the system of this embodiment is described as follows. The following is also the description for a preferred embodiment of the manufacturing method of this invention.

First of all, unprocessed substrates 9 are loaded to a first carrier 2 in the load-lock chamber 81. This carrier 2 is moved to the pre-heat chamber 83, in which the substrates 9 are pre-heated. Meanwhile, other unprocessed substrates 9 are loaded to a next carrier 2 in the load-lock chamber 81. After one tact-time passes, the first carrier 2 is moved to the anisotropy-allowing-layer preparation chamber 1, in which the anisotropy-allowing layer is prepared as described. Meanwhile, the next carrier 2 is moved to the pre-heat chamber 83, in which the substrates 9 are pre-heated, and other unprocessed substrates 9 are loaded to a next carrier 2 in the load-lock chamber 81.

After one more tact-time passes, the carrier 2 in the anisotropy-allowing-layer preparation chamber 1 is moved to the gas-exposure chamber 89, in which the surface of the anisotropy-allowing layer is exposed to oxygen gas. The carrier 2 in the pre-heat chamber 83 is moved to the anisotropy-allowing-layer preparation chamber 1.

Repeating such the steps, every carrier 2 is moved to a next chamber at every tact-time. The pre-heat, the anisotropy-allowing-layer preparation, the oxygen gas exposure, the underlying-layer preparation, the intermediate-layer preparation, the magnetic-recording-layer preparation and the overcoat preparation are carried out on each substrate 9 in this order. After the overcoat preparation, the carrier 2 is moved to the unload-lock chamber 82, in which the processed substrates 9 are unloaded from the carrier 2. In these steps, if any layer is composed of a plurality of films, i.e. laminated layer, the preparation step may be carried out subsequently in a series of chambers.

Figure 6:
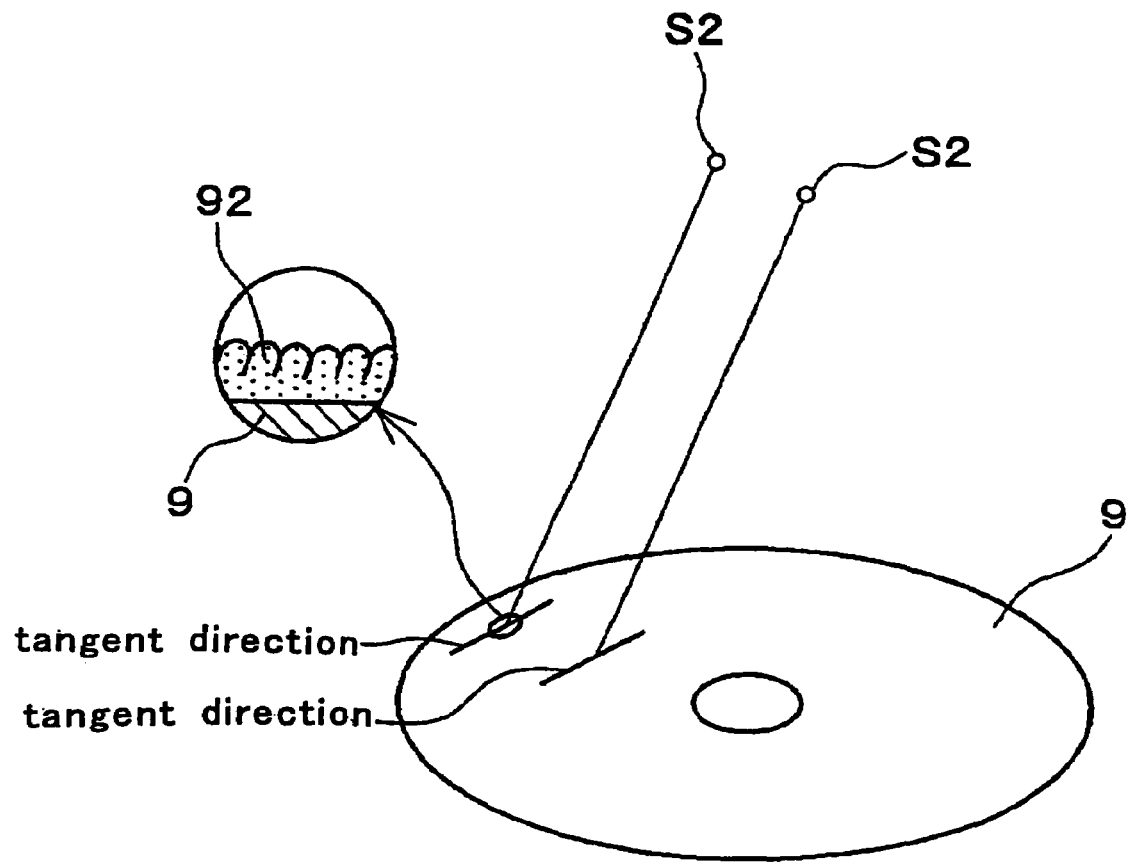
FIG. 6 is a schematic strabismus view explaining the anisotropy allowance by deviant oblique sputtered-particles.

The method and the system of this embodiment as described can perform the anisotropy allowance effectively. This point is described as follows using FIG. 6. Why the deviant oblique sputtered-particles contribute to the anisotropy allowance is not completely clear. Following is one presumption for this. As shown in FIG. 6, the deviant oblique sputtered-particles incident on the substrate 9 have a direction component along a tangent of a circle coaxial to the substrate 9. When many sputtered particles having a direction component not perpendicular to the substrate 9 are incident on the substrate 9, it is presumed that axes of crystals in the thin film being deposited tend to be oblique to this direction, or crystals tend to grow to this direction. For example, many fine bumps 92 leaning to a tangent direction are possibly formed, as schematically drawn are FIG. 6. If such many sputtered particles having a fixed direction component are incident on the substrate 9, structure or property of the deposited thin film becomes anisotropic along this direction. Overlaying the underlying layer, the intermediate layer and the magnetic recording layer in order on such the anisotropic thin film, the magnetic recording layer would capture the anisotropy as well.

Following is the description for one of presumable models based on crystal structure, though it is not completely clear. For example, when a Cr or Cr alloy film is deposited as the underlying film at a high temperature, the film obtains the body-centered cubic structure, where the [100] direction is in parallel to the substrate 9. Cobalt base ferromagnetic alloy such as CoCrPtTa or CoCrPtB has the hexagonal close-packed (hcp) structure. Therefore, when a Co base ferromagnetic alloy film is deposited on the underlying layer of Cr or Cr alloy, "c" axis, i.e. center axis of hexagon, in the crystals of the Co base ferromagnetic alloy film may correspond to the [110] direction in the crystals of the underlying layer. If the [110] direction is directed to a tangent direction, "c" axis of the Co base ferromagnetic alloy film may be directed to the tangent direction as well. As a result, the magnetic anisotropy where coercive force is higher along the tangent direction is allowed. As easily understood, the above described model is on the condition that the underlying layer is deposited in state that its [110] direction is directed to the tangent direction. The anisotropy-allowing layer has supposedly the function to orient the crystals of the underlying film to this direction.

As understood from the configuration where the target is rotated in coaxial with the substrate 9, this embodiment allows the circumferential anisotropy. Concretely, as shown in FIG. 6, sputtered particles S2 incident obliquely on the substrate 9 have the direction component along a tangent. Because the target is rotated against the standing substrate 9, the inclinations of the crystals shown in FIG. 6 associate circumferentially. Therefore, coercive force in magnetizing circumferentially is higher than coercive force in magnetizing along a radius direction.

The direction control board 39 has the function to promote the anisotropy allowance by the described deviant oblique sputtered-particles. Concretely, the direction control board 39 screens the center-center sputtered-particles. Therefore, relatively a larger number of the deviant oblique sputtered-particles are incident on the substrate 9, resulting in that the anisotropy allowance along the circumferential direction is promoted. Still, it is possible to allow the anisotropy without the direction control board 39, only by the oblique-incidence configuration of sputtered particles. Moreover, instead of the direction control board 39, if the system comprises another direction control board to screen the deviant oblique sputtered particles and pass relatively a larger number of the center-center sputtered particles, the anisotropy along radius directions can be promoted.

Though the anisotropy is allowed by preparing a thin film of sputtered-particles obliquely incident on the substrate 9 as described, it has turned out in the research by the inventors that the anisotropy allowing depends on material of the thin film. Specifically, it has turned out that material or base material of thin films that demonstrates the anisotropy allowance is limited to niobium, tantalum, niobium alloy, and tantalum alloy. Further, it has turned out that it requires nitrogen-gas introduction during depositing the thin film, or nitrogen involvement of the thin film. Following is the description about the results of experiments for confirming these points.

TABLE 1

| Anisotropy-allowing film | Perpendicular incidence (Cr film) | Oblique incidence (Cr film) |
| --- | --- | --- |
| Not exist | OR = 1.0 | OR = 1.0 |
| Exists (CrNb nitride film) | OR = 1.1 | OR = 1.2 |

Table 1 shows the result of an experiment for confirming material dependency and oblique-incidence dependency of the anisotropy allowance. In this experiment, first, a Cr film was deposited on a substrate at 20 nm (thickness) as the underlying layer, without the anisotropy-allowing-layer preparation. On this Cr film, a CoCrPtB film was deposited at 20 nm as the magnetic recording layer. The magnetic anisotropy of this magnetic recording layer was measured. In Table 1, "OR" means the magnetic anisotropy, where;

OR=(coercive force in circumferential magnetization)/(coercive force in radius magnetization).

Next, on another substrate, after depositing a CrNb nitride film as the anisotropy-allowing layer, a Cr film as the underlying layer and a CoCrPtB film as the magnetic recording layer were deposited in the same way. Then, the magnetic anisotropy was measured. In this experiment, the Cr film depositions were carried out on the two different sputtering configurations; i.e. the sputtered-particles perpendicular-incidence configuration where the substrate and the target face to each other coaxially, and the described sputtered-particles oblique-incidence configuration. Therefore, there were four samples in this experiment. In each deposition, each substrate was maintained at 200° C., and the sputter-discharge power was 500 W. In depositing the CrNb nitride film, gas mixture of argon and nitrogen where nitrogen is added at 5 to 30% against argon is used. Pressure in the chamber during depositing the CrNb nitride film was 2 Pa. After the CrNb nitride film deposition, the substrate was exposed to atmospheric gas of $10^{-3}$ Pa in another chamber. Composition of the CrNb alloy target used in this experiment was 70Cr-30Nb(at %). The gas exposure may be carried out subsequently in the chamber where the CrNb nitride film is deposited. In this case, after depositing the CrNb film, the chamber is pumped down to a required pressure lower than $10^{-3}$ Pa. Then, atmospheric gas is introduced to the chamber so that as the pressure can be $10^{-3}$ Pa, exposing the substrate to the atmospheric gas of $10^{-3}$ Pa.

As shown in Table 1, in case of no anisotropy-allowing layer, OR was 1 even when the Cr film was deposited in the sputtered-particles oblique-incidence configuration, demonstrating no anisotropy allowance. Contrarily, in case the CrNb nitride film was deposited as the anisotropy-allowing layer, OR was 1.1 even in the case that the Cr film was deposited in the sputtered-particles perpendicular-incidence configuration, demonstrating the anisotropy allowance. And, OR was 1.2 in the case that the Cr film was deposited in the sputtered-particles oblique-incidence configuration, demonstrating the higher anisotropy-allowance. In the samples of no anisotropy-allowing layer, material under the Cr film was the substrate itself. However, OR was still 1 even when a NiP film or NiAl film was provided between a substrate and a Cr film as well as the conventional.

Figure 7:
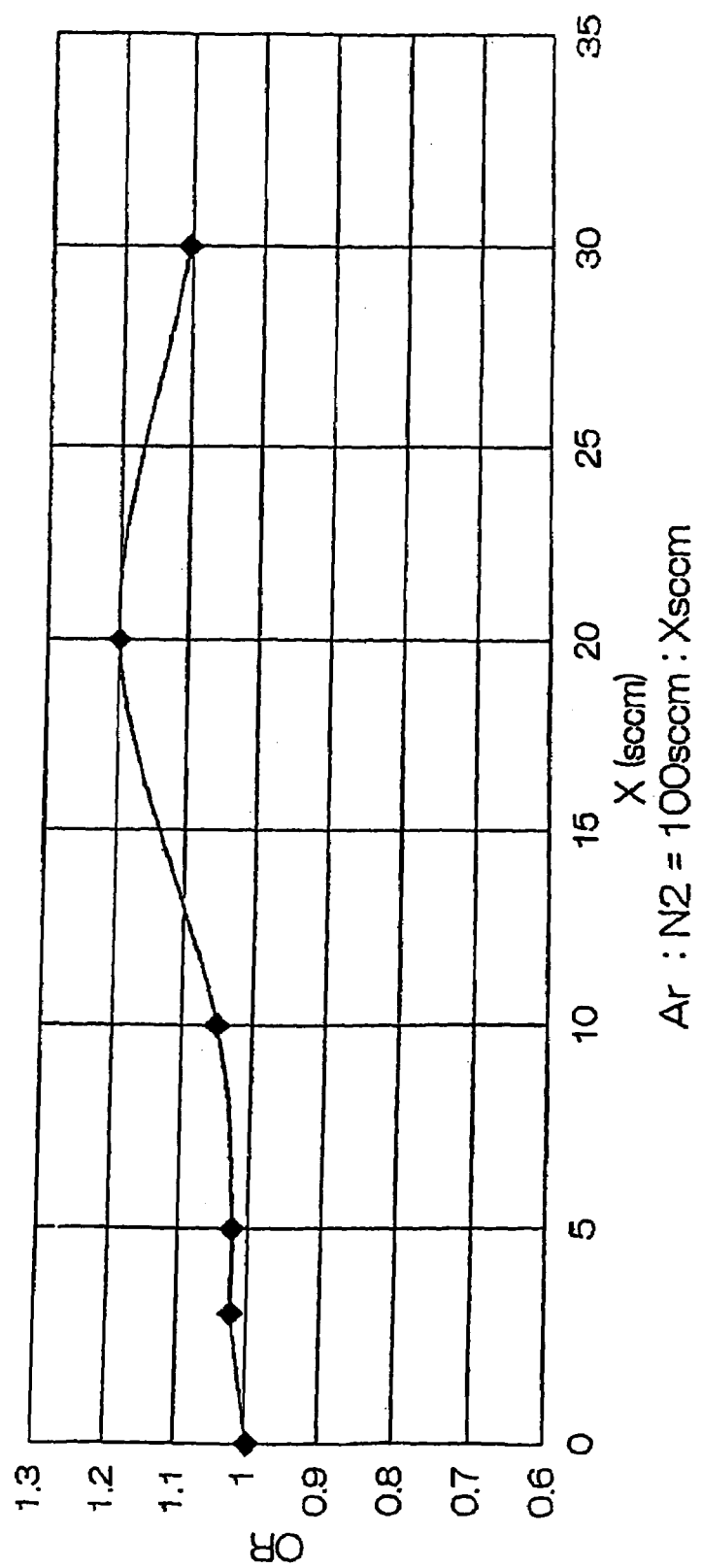
FIG. 7 shows the result of an experiment for confirming dependency on existence of nitrogen in the anisotropy-allowing film.
Figure 8:
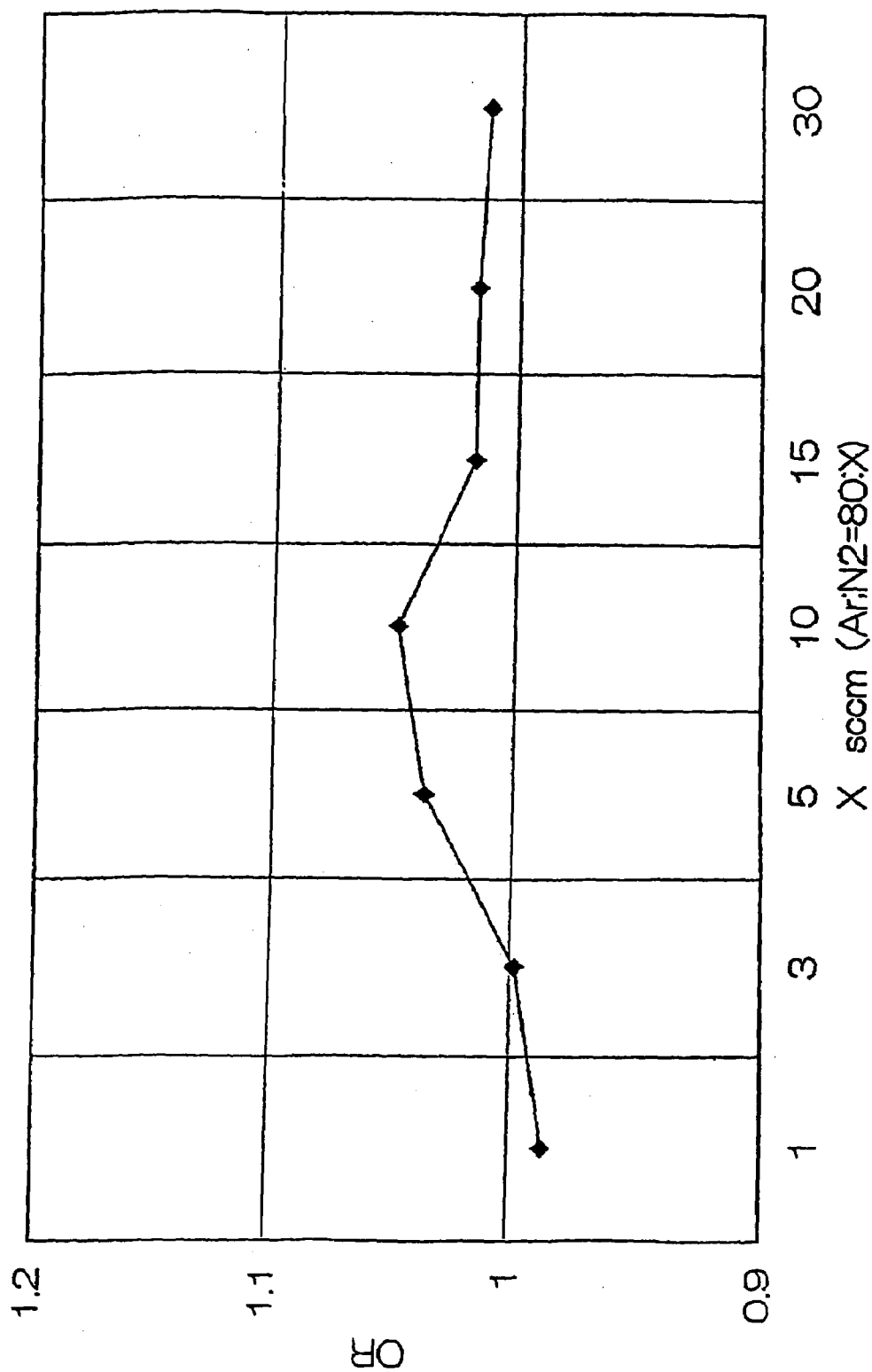
FIG. 8 also shows the result of another experiment for confirming dependency on existence of nitrogen in the anisotropy-allowing film.

Following is the description about the results of experiments confirming dependency of the magnetic anisotropy on existence of nitrogen in the anisotropy-allowing layer, using FIG. 7 and FIG. 8. FIG. 7 and FIG. 8 show dependency on volume of nitrogen gas added in depositing the anisotropy-allowing film. FIG. 7 shows dependency on existence of nitrogen in a CrNb film. FIG. 8 shows dependency on existence of nitrogen in a CrTa film.

In the experiment shown in FIG. 7, the CrNb film was deposited as the anisotropy-allowing layer, varying volume (flow rate) of nitrogen added against argon of 100 SCCM. "SCCM" means gas flow rate converted at 0° C. and 1atm, standing for "Standard Cubic Centimeter per Minute". As shown in FIG. 7, in case of no nitrogen gas addition, OR was 1, demonstrating no anisotropy. Increasing volume of nitrogen gas added, the anisotropy was enhanced gradually, reaching the peak at about 20 SCCM. This result demonstrates that 20% is the optimum rate of nitrogen against argon in depositing the CrNb film.

In the experiment shown in FIG. 8, the CrTa film is deposited as the anisotropy-allowing layer, varying volume of nitrogen added against argon of 80 SCCM. As shown in FIG. 8, in case of small volume of nitrogen gas addition such as 1 SCCM, OR was under 1, demonstrating the anisotropy opposite against the desired one. Increasing volume of nitrogen gas, the desired circumferential anisotropy appeared, reaching the peak at about 10 SCCM. This result demonstrates that 10% is the optimum rate of nitrogen against argon in depositing the CrTa film.

Following is the description about the effect of atmospheric-gas exposure after the anisotropy-allowing film deposition. The inventors examined two different processes in the experiment shown in FIG. 7, and compared the results. One is the case that the underlying layer and the magnetic recording layer were deposited directly after the anisotropy-allowing-film deposition. The other one is the case that the surface of the deposited anisotropy-allowing film was exposed to the atmospheric gas prior to the preparations of the underlying layer and the magnetic recording layer. The magnetic anisotropy was a little smaller than 1.1 in the case of no atmospheric-gas-exposure step. Contrarily, the magnetic anisotropy was enhanced up to about 1.2 in the case that the underlying layer and the magnetic recording layer were prepared after the surface of the anisotropy-allowing film was exposed to the atmospheric gas of 2 Pa for about one minute. When oxygen gas or nitrogen gas is used instead of atmospheric gas in the gas exposure, the results were similar. These results supposedly demonstrate the magnetic anisotropy can be enhanced further by shallowly oxidizing the surface of an anisotropy-allowing film, or by carrying out such a denaturalizing step as to increase nitrization degree superficially at the anisotropy-allowing film. In case a CrNb film is deposited as the anisotropy-allowing film, niobium content of the film is preferably 20 at % to 80 at %, more preferably 30 at % to 50 at %. Tantalum content of a CrTa film is the same as this. As described, because the magnetic anisotropy of the magnetic recording layer is enhanced effectively in this embodiment, the system and the method of this embodiment can suppress the problem of thermal decay, contributing greatly to high-density magnetic recording.

For controlling crystal orientation, there is a method to provide fine grooves on a surface under a film to be deposited. When a film is deposited on a surface of fine grooves, crystals of the film tend to be oriented to longitudinal directions of the grooves. As a result, magnetic anisotropy is allowed to the deposited film along the longitudinal directions of the grooves. Such a surface configuration for allowing the magnetic anisotropy is called "texture" in this specification.

In the described conventional hard-disk manufacturing process, for example, fine grooves as texture are provided with a NiP film. Because hard-disk drives rotate a magnetic recording disk around its center axis against a standing magnetic head during write-and-readout of information, directions of magnetization are usually circumferential, more precisely tangent directions of circles coaxial with the disk. Therefore, the magnetic anisotropy is required to be allowed to circumferential directions. For such the anisotropy, fine grooves as texture are usually provided circumferentially in coaxial to a substrate. In a cross section, this type of texture is saw-tooth-shaped.

Crystal orientation of an underlying film deposited on such the NiP film having the grooves tends to be circumferential, resulting in that crystal orientation of a magnetic recording film deposited on it tends to be circumferential as well. Therefore, the magnetic anisotropy where coercive force is higher in the circumferential magnetization is allowed to the magnetic film.

Figure 9:
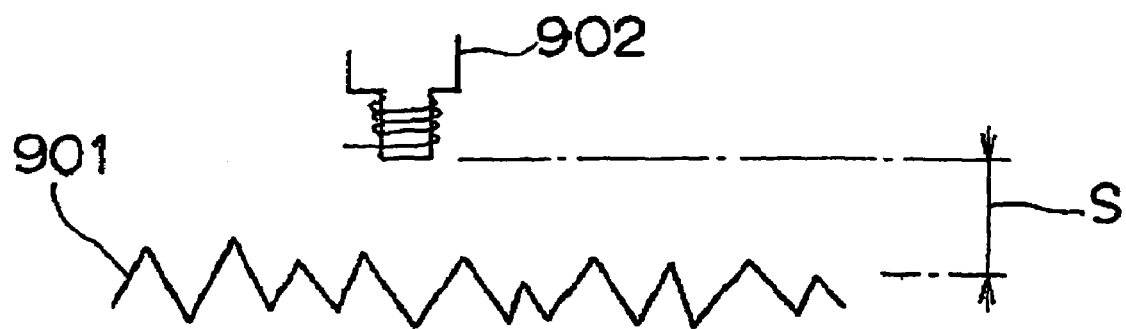
FIG. 9 shows relation of spacing and texture.

However, the described anisotropy allowance by the texture bears some disadvantages with respect to demand for narrowing spacing. This point is described as follows using FIG. 9. As described, narrowing spacing is required for enhancing recording density. However, texture could be an obstructive factor for narrowing spacing. As shown in FIG. 9, if a texture exists, the surface 901 of a magnetic recording layer is uneven, i.e. concave-convex, corresponding to the shape of the texture. The distance to a magnetic head 902, i.e. spacing S, can be narrower to some extent at the convexes. However, spacing S is inevitably wider at the concaves. Therefore, write-and-readout of information might be unstable at the concaves. If the magnetic head 902 is located closer to the surface 901 of the magnetic recording layer, it would contact such an overlying layer as overcoat (not shown in FIG. 9). As a result, there might arise a problem that the magnetic head 902 is stuck on the magnetic recording disk, or the magnetic recording disk is damaged by the magnetic head 902.

Such the problems can be solved by providing a lubricant layer on the top of the magnetic recording disk. However, as far as a texture exists, it is impossible to make spacing narrower than height (or depth) of the texture. Therefore, there has been great demand for a technique to allow the magnetic anisotropy without providing texture.

The described system and method of this embodiment can present such the technique. In this embodiment, no texture-providing step is required. Without texture, the described effect of the anisotropy allowance can be obtained as well. Therefore, this embodiment brings no obstructive factor for narrowing spacing, contributing to the recording density enhancement. Still, the present invention does not exclude to provide a texture. When a texture is provided in this invention, the allowed magnetic anisotropy can be enhanced furthermore.

Direction control of sputtered particles in depositing films by sputtering is not indispensable in this invention. For example, in case a texture is provided on a substrate in this invention, it is possible to allow the magnetic anisotropy by a normal sputtering configuration. Otherwise, the anisotropy allowance is enabled only by locating a target eccentrically to a substrate for the sputtered-particles oblique-incidence configuration, without using a direction control board.

Though the target 30 is rotated against the standing substrate 9 in the described embodiment, the same effect of the anisotropy allowance is obtained even in case that the substrate 9 is rotated against the standing target 30. Though hard-disks were described as examples of magnetic recording disks, this invention can be applied to other magnetic recording disks such as flexible disks and ZIP disks. Moreover, this invention can be applied to magnetic recording disks that utilize a function other than magnetism in addition to magnetism, for example magneto-optical (MO) disks. In addition, the concept of this invention can be applied to manufacture of semiconductor devices utilizing function of magnetism, such as magnetic random access memory (MRAM).

What is claimed is:

1. A system for manufacturing a magnetic recording disk, comprising:
    a magnetic-recording-layer preparation chamber in which a magnetic recording layer is prepared on a substrate;
    an anisotropy-allowing layer preparation chamber in which an anisotropy-allowing layer to allow magnetic anisotropy to the magnetic recording layer is prepared on the substrate by sputtering prior to preparation of the magnetic recording layer, as a relatively larger number of sputtered particles having direction components along a direction of the magnetic anisotropy to be allowed are incident on the substrate; and
    a transfer mechanism for transferring the substrate from the anisotropy-allowing layer preparation chamber to the magnetic recording layer preparation chamber;
    wherein the anisotropy-allowing layer is made of nitride of niobium, tantalum, niobium alloy or tantalum alloy; or nitrogen-including niobium, tantalum, niobium alloy or tantalum alloy;
    further comprising:
    a gas-exposure chamber in which a prepared anisotropy-allowing layer is exposed to atmospheric gas, nitrogen gas or oxygen gas, prior to preparation of the magnetic recording layer in the magnetic-recording-layer preparation chamber.

2. A system for manufacturing a magnetic recording disk, comprising:
    a magnetic-recording-layer preparation chamber in which a magnetic recording layer is prepared on a substrate;
    an anisotropy-allowing layer preparation chamber in which an anisotropy-allowing layer to allow magnetic anisotropy to the magnetic recording layer is prepared on the substrate by sputtering prior to preparation of the magnetic recording layer;
    a pumping line pumping the anisotropy-allowing layer preparation chamber;
    the gas-introduction line introducing a gas for sputtering into the anisotropy-allowing layer preparation chamber;
    a cathode unit having a target of which a surface to be sputtered is exposed to an inside of the anisotropy-allowing layer preparation chamber;
    a sputtering power source applying voltage for the sputtering to the target, thereby igniting a sputtering discharge;
    a direction control board making a relatively larger number of sputtered particles having direction components along a direction of the magnetic anisotropy to allow incident on the substrate; and
    a transfer mechanism for transferring the substrate from the anisotropy-allowing layer preparation chamber to the magnetic recording layer preparation chamber;
    wherein the gas-introduction line introduces nitrogen gas so as to deposit a nitride film or nitrogen-including film as the anisotropy-allowing layer;
    further comprising:
    a gas-exposure chamber in which a prepared anisotropy-allowing layer is exposed to atmospheric gas, nitrogen gas or oxygen gas, prior to preparation of the magnetic recording layer in the magnetic-recording-layer preparation chamber.

3. The system for manufacturing a magnetic recording disk as claimed in claim 2,
    wherein the direction control board has a shape where sputtered particles traveling to a direction interconnecting a center of the target and a center of the substrate are screened, and a relatively larger number of sputtered particles deviating from the direction are incident on the substrate.

4. The system for manufacturing a magnetic recording disk as claimed in claim 2, wherein the target is made of niobium, tantalum, niobium alloy or tantalum alloy.

5. A system for manufacturing a magnetic recording disk, comprising:
    a magnetic-recording-layer preparation chamber in which a magnetic recording layer is prepared on a substrate;
    an anisotropy-allowing layer preparation chamber in which an anisotropy-allowing layer to allow magnetic anisotropy to the magnetic recording layer is prepared on the substrate by sputtering prior to preparation of the magnetic recording layer;
    a pumping line pumping the anisotropy-allowing layer preparation chamber;
    the gas-introduction line introducing a gas for sputtering into the anisotropy-allowing layer preparation chamber;
    a cathode unit having a target of which a surface to be sputtered is exposed to an inside of the anisotropy-allowing layer preparation chamber;
    a sputtering power source applying voltage for the sputtering to the target, thereby igniting a sputtering discharge;
    a direction control board making a relatively larger number of sputtered particles having direction components along a direction of the magnetic anisotropy to allow incident on the substrate; and
    a transfer mechanism for transferring the substrate from the anisotropy-allowing layer preparation chamber to the magnetic recording layer preparation chamber;

wherein the gas-introduction line introduces nitrogen gas so as to deposit a nitride film or nitrogen-including film as the anisotropy-allowing layer, wherein
the target is located eccentrically to the substrate in the anisotropy-allowing layer preparation chamber,
a rotation mechanism to rotate the target around a center axis of the standing substrate is provided, and
the direction-control board is fixed to the target.

6. The system for manufacturing a magnetic recording disk as claimed in claim 5; wherein
a plurality of the targets are provided on a circle,
the substrate is located coaxial to the circle, and
the targets are rotated together around an axis of the circle by the rotation mechanism.

7. The system for manufacturing a magnetic recording disk as claimed in claim 5, wherein the target is made of niobium, tantalum, niobium alloy or tantalum alloy.

8. A system for manufacturing a magnetic recording disk, comprising:
a first chamber in which a magnetic recording layer is prepared on a substrate;
a second chamber in which an anisotropy-allowing layer to allow magnetic anisotropy to the magnetic recording layer is prepared on the substrate by sputtering prior to preparation of the magnetic recording layer; and
a third chamber in which an underlying layer is prepared on the anisotropy-allowing layer on the substrate by sputtering, prior to preparation of the magnetic recording layer; wherein
in the second chamber, a first target is provided eccentrically to the substrate placed therein so that sputtered particles from the first target are incident obliquely on the substrate; and
in the third chamber, a second target is provided eccentrically to the substrate placed therein so that sputtered particles from the second target are incident obliquely on the substrate.

9. The system for manufacturing a magnetic recording disk as claimed in claim 8, further comprising
a gas-exposure chamber in which the prepared anisotropy-allowing layer is exposed to atmospheric gas, nitrogen gas or oxygen gas, prior to preparation of the magnetic recording layer in the first chamber.

10. The system for manufacturing a magnetic recording disk as claimed in claim 8, wherein
the anisotropy-allowing layer is made of nitride of niobium, tantalum, niobium alloy or tantalum alloy; or nitrogen-including niobium, tantalum, niobium alloy or tantalum alloy.

11. The system for manufacturing a magnetic recording disk as claimed in claim 8, wherein
the anisotropy-allowing layer is made of nitride of tantalum or tantalum alloy; or nitrogen-including tantalum or tantalum alloy.

12. The system for manufacturing a magnetic recording disk as claimed in claim 8, wherein
the underlying layer is made of chromium.

13. The system for manufacturing a magnetic recording disk as claimed in claim 8, wherein
the first target is provided at a position where sputtered particles from the first target are incident on the substrate essentially from only a side of the first target provided eccentrically, and
the second target is provided at a position where sputtered particles from the second target are incident on the substrate essentially from only a side of the second target provided eccentrically.

14. A system for manufacturing a magnetic recording disk, comprising:
a first chamber in which a magnetic recording layer is prepared on a substrate;
a second chamber in which an anisotropy-allowing layer to allow magnetic anisotropy to the magnetic recording layer is prepared on the substrate by sputtering, prior to preparation of the magnetic recording layer; and
a third chamber in which an underlying layer is prepared on the substrate by sputtering, prior to preparation of the magnetic recording layer; wherein
in the second chamber, a plurality of first targets are provided on a circle eccentric to the substrate placed therein;
each distance of each two neighboring first targets is equal; and
a board screening sputtered particles traveling in a direction interconnecting an axis of one of the first target and an axis of the substrate is provided in the second chamber.

15. The system for manufacturing a magnetic recording disk as claimed in claim 14, further comprising
a rotation mechanism to rotate the first targets around an axis co-centric to the substrate, wherein
the board is fixed to the one of the first targets so that the board is rotated together with the one of the first targets.

16. The system for manufacturing a magnetic recording disk as claimed in claim 14, further comprising
a gas-exposure chamber in which the prepared anisotropy-allowing layer is exposed to atmospheric gas, nitrogen gas or oxygen gas, prior to preparation of the magnetic recording layer in the first chamber.

17. The system for manufacturing a magnetic recording disk as claimed in claim 14, wherein
the anisotropy-allowing layer is made of nitride of niobium, tantalum or tantalum alloy; or nitrogen-including niobium, tantalum, niobium alloy or tantalum alloy.

18. The system for manufacturing a magnetic recording disk as claimed, in claim 14, wherein
the anisotropy-allowing layer is made of nitride of tantalum or tantalum alloy; or nitrogen-including tantalum or tantalum alloy.

19. The system for manufacturing a magnetic recording disk as claimed in claim 14, wherein
the underlying layer is made of chromium.

* * * * *